US011866292B2

(12) United States Patent
Takahashi et al.

(10) Patent No.: US 11,866,292 B2
(45) Date of Patent: Jan. 9, 2024

(54) IMAGE FORMING APPARATUS

(71) Applicant: KONICA MINOLTA, INC., Tokyo (JP)

(72) Inventors: Atsushi Takahashi, Akishima (JP); Hitoshi Asano, Toyokawa (JP); Yumiko Izumiya, Hachioji (JP); Hirotada Seki, Toyokawa (JP); Akimasa Ishikawa, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 112 days.

(21) Appl. No.: 17/529,414

(22) Filed: Nov. 18, 2021

(65) Prior Publication Data

US 2022/0185615 A1 Jun. 16, 2022

(30) Foreign Application Priority Data

Dec. 11, 2020 (JP) ................................ 2020-205680

(51) Int. Cl.

| | |
|---|---|
| ***B65H 7/20*** | (2006.01) |
| ***B65H 43/00*** | (2006.01) |
| ***B65H 11/00*** | (2006.01) |
| ***G03G 15/00*** | (2006.01) |

(52) U.S. Cl.

CPC ............... *B65H 7/20* (2013.01); *B65H 11/00* (2013.01); *B65H 43/00* (2013.01); *G03G 15/5029* (2013.01); *B65H 2405/332* (2013.01); *B65H 2511/13* (2013.01); *B65H 2511/135* (2013.01); *B65H 2511/416* (2013.01); *B65H 2515/10* (2013.01); *B65H 2515/81* (2013.01); *B65H 2553/80* (2013.01); *B65H 2801/06* (2013.01); *G03G 2215/00447* (2013.01)

(58) Field of Classification Search

CPC .......... B65H 2511/416; B65H 2511/13; B65H 2511/135; B65H 43/00; B65H 11/00; B65H 2553/80; B65H 2801/06; G03G 15/5029

See application file for complete search history.

(56) References Cited

U.S. PATENT DOCUMENTS 9,415,959 B2 * 8/2016 Iwami ...................... B65H 7/20

FOREIGN PATENT DOCUMENTS

| | | |
|---|---|---|
| JP | 2010211062 A | 9/2010 |
| JP | 2015160737 A | 9/2015 |
| JP | 2018106112 A | 7/2018 |

* cited by examiner

*Primary Examiner* — Jeremy R Severson

(74) *Attorney, Agent, or Firm* — Holtz, Holtz & Volek PC

(57) ABSTRACT

An image forming apparatus includes an image former that forms an image on a sheet of paper, a detector that detects a physical property of a sheet of paper, a receiver that receives paper identification information used in identification of a sheet of paper designated by a user, and a hardware processor. The hardware processor performs: first judgement of judging whether or not there is a correspondence between the paper identification information received by the receiver and a detection result by the detector, second judgement of judging whether or not there is a correspondence between a detection result by the detector of a first sheet of paper conveyed and a detection result by the detector of a second sheet of paper conveyed; and operation control of the image former based on a first judgement result in the first judgement and a second judgement result in the second judgement.

9 Claims, 6 Drawing Sheets

IMAGE FORMING APPARATUS

CROSS-REFERENCE TO RELATED APPLICATIONS

The entire disclosure of Japanese Patent Application No. 2020-205680 filed on Dec. 11, 2020 is incorporated herein by reference in its entirety.

BACKGROUND

Technological Field

The present invention relates to an image forming apparatus.

Description of Related Art

Conventionally, various types of paper such as high-quality paper, coated paper, straw paper, etc. are used in image forming apparatuses such as printers and multi-functional peripherals. In order to check whether or not paper of a correctly intended type is being used, various image forming apparatuses having paper detection means to detect physical properties of the paper have been developed.

For example, according to an image forming apparatus of JP 2010-211062 A in which a plurality of sheets of paper are sequentially conveyed to enable multi-page image forming output, it is proposed to stop the image forming output based on a difference between a property of an already output sheet of paper and a property of a newly detected sheet of paper.

Alternatively, according to an image forming apparatus of JP 2018-106112 A, when a first media property of a recording material during conveyance detected by a media detecting means differs from a second media property of a recording material on which an image has already been formed, and when an image forming condition corresponding to the first media property differs from an image forming condition corresponding to the second media property, it is proposed to pause image formation and conveyance of the recording material.

Alternatively, according to an image forming apparatus of JP 2015-160737 A that has a paper type detecting means that detects a type of paper conveyed from a paper feeding cassette, when the paper type changes during printing, a search is performed to determine whether or not there is another paper feeding cassette that contains paper of the same paper type as the one before the change in paper type, and if another paper feeding cassette is found, paper conveyance is restarted from the another paper feeding cassette.

However, even in the conventional technologies described above, when there is a time lag from an execution instruction to the image forming apparatus to the execution of image formation, when multiple execution instructions occur all at once, or the like, it is difficult to recognize a correspondence of what kind of paper is used in each job. This could lead to operational errors, such as supplying wrong paper to the image forming apparatus or stacking paper bundles of different types. In such a case, image formation is performed on a sheet of paper that is not intended by the user, and the output material is wasted.

SUMMARY

The present invention was made in consideration of the above problems in the conventional technologies, and aims to reduce the waste of output materials due to mistakes in paper types.

To achieve at least one of the above-mentioned objects, an image forming apparatus reflecting one aspect of the present invention includes: an image former that forms an image on a sheet of paper, a detector that detects a physical property of a sheet of paper; a receiver that receives paper identification information used in identification of a sheet of paper designated by a user, and a hardware processor that performs: first judgement of judging whether or not there is a correspondence between the paper identification information received by the receiver and a detection result by the detector; second judgement of judging whether or not there is a correspondence between a detection result by the detector of a first sheet of paper conveyed and a detection result by the detector of a second sheet of paper conveyed; and operation control of the image former based on a first judgement result in the first judgement and a second judgement result in the second judgement.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein.

DETAILED DESCRIPTION OF THE EMBODIMENTS

Hereinafter, one or more embodiments of the present invention will be described with reference to the drawings. However, the scope of the invention is not limited to the illustrated examples.

First Embodiment

Figure 1:
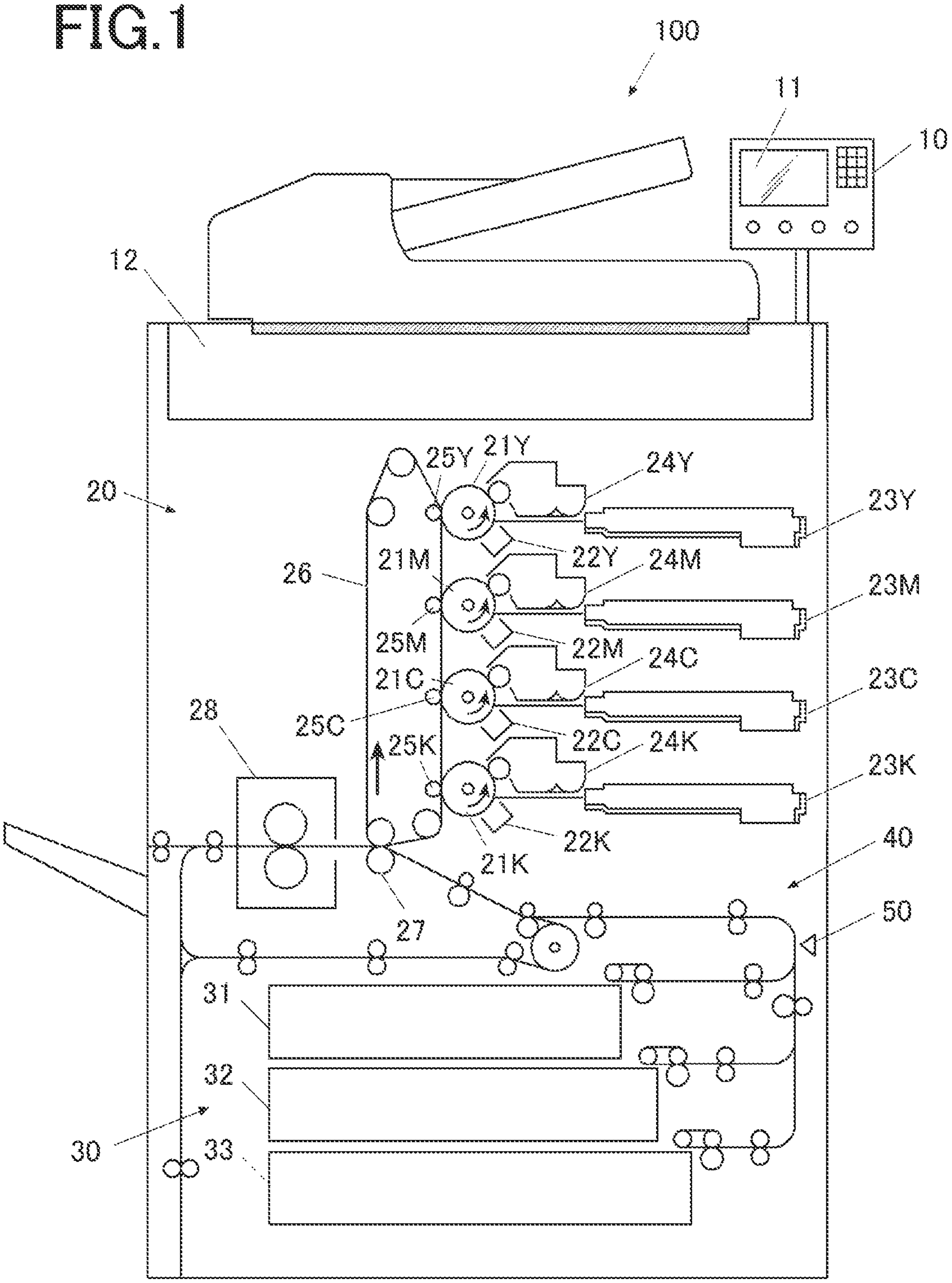
FIG. 1 is a schematic cross-sectional diagram showing an overall configuration of an image forming apparatus in a first embodiment of the present invention.

FIG. 1 is a schematic cross-sectional diagram showing an overall configuration of the image forming apparatus 100 according to a first embodiment of the present invention.

The image forming apparatus 100 is a tandem type image forming apparatus that forms color images by an electro photographic method based on image data obtained by reading images from a document or image data received from an external device.

As shown in FIG. 1, the image forming apparatus 100 includes an operation interface 10, a display 11, a scanner 12, an image former 20, a paper feeder 30, a conveyer 40, a paper detector (detector) 50, and the like.

The operation interface 10 has a touch panel formed so as to cover the display screen of the display 11 and various operation buttons such as numeric buttons, a start button, and the like, and outputs operation signals to a controller (a hardware processor) 60 (see FIG. 2) based on operations by a user. The interface 10 receives operation commands from the user.

The display 11 is configured with an LCD (Liquid Crystal Display) and the like, and displays various screens according to a command of display signals that is input from the controller 60.

The scanner 12 optically scans a document that has been conveyed from an ADF (Auto Document Feeder) onto a contact glass or a document that has been put on the contact glass, forms an image on a light receiving surface of a CCD (Charge Coupled Device) based on reflected light of the light that has been illuminated for scan from a light source to the document, read the document image, performs A/D conversion of the read image, and outputs the obtained image data to the controller 60.

The image former 20 forms an image on a sheet of paper. The image former 20 includes photoreceptor drums 21Y, 21M, 21C, 21K, charging units 22Y, 22M, 22C, 22K, exposure units 23Y, 23M, 23C, 23K, developing units 24Y, 24M, 24C, 24K, and primary transfer rollers 25Y, 25M, 25C, 25K, corresponding to yellow (Y), magenta (M), cyan (C), and black (K) colors, intermediate transfer belt 26, secondary transfer roller 27, and a fixing unit 28.

The charging units 22Y, 22M, 22C, 22K uniformly charges the photoreceptor drums 21Y, 21M, 21C, 21K.

The exposure units 23Y, 23M, 23C, 23K are configured with laser light sources, polygon mirrors, lenses, and the like, and form electrostatic latent images by scanning and exposing surfaces of the photoreceptor drums 21Y, 21M, 21C, 21K with laser beams based on the image data of the respective colors.

The developing units 24Y, 24M, 24C, and 24K develop images by applying toner of respective colors to the electrostatic latent images on the photoreceptor drums 21Y, 21M, 21C, and 21K.

The primary transfer rollers 25Y, 25M, 25C, and 25K successively transfer the toner images of the respective colors formed on the photoreceptor drums 21Y, 21M, 21C, and 21K onto the intermediate transfer belt 26 (primary transfer). In other words, a color toner image is formed on the intermediate transfer belt 26, in which the toner images of the four colors are superimposed.

The secondary transfer roller 27 transfers the color toner image on the intermediate transfer belt 26 all at once onto a sheet of paper supplied from the paper feeder 30 (secondary transfer).

The fixing unit 28 heats and pressurizes a sheet of paper that passes through a nip formed with a heating roller and a pressurizing roller and fixes the toner image onto the sheet of paper.

The paper feeder 30 includes a plurality of paper feeding trays 31, 32, 33 for feeding paper, and feeds sheets of paper stored in each of the paper feeding trays 31, 32, 33 to the image former 20. The paper types and sizes of the sheets of paper stored in the respective paper feeding trays 31, 32, 33 are determined in advance for each paper feeding tray.

The conveyer 40 includes conveyance rollers and the like for conveying sheets in the image forming apparatus 100, from the time when a sheet stored in the paper feeding tray 31, 32, 33 is fed to the image former 20 until the sheet after fixing is discharged outside the apparatus.

The paper detector 50 detects physical properties of the paper and is provided on the conveyance path from the paper feeder 30 to the image former 20. The paper detector 50 detects values (hereinafter referred to as "physical property values") related to several physical properties of the paper, including basis weight, surface property, and thickness. The physical property values may be information that can be converted to physical properties. The paper detector 50 may further detect physical properties of paper such as gloss, stiffness, and grain direction. The paper detector 50 may be a single sensing element or may include a plurality of sensing elements.

Figure 2:
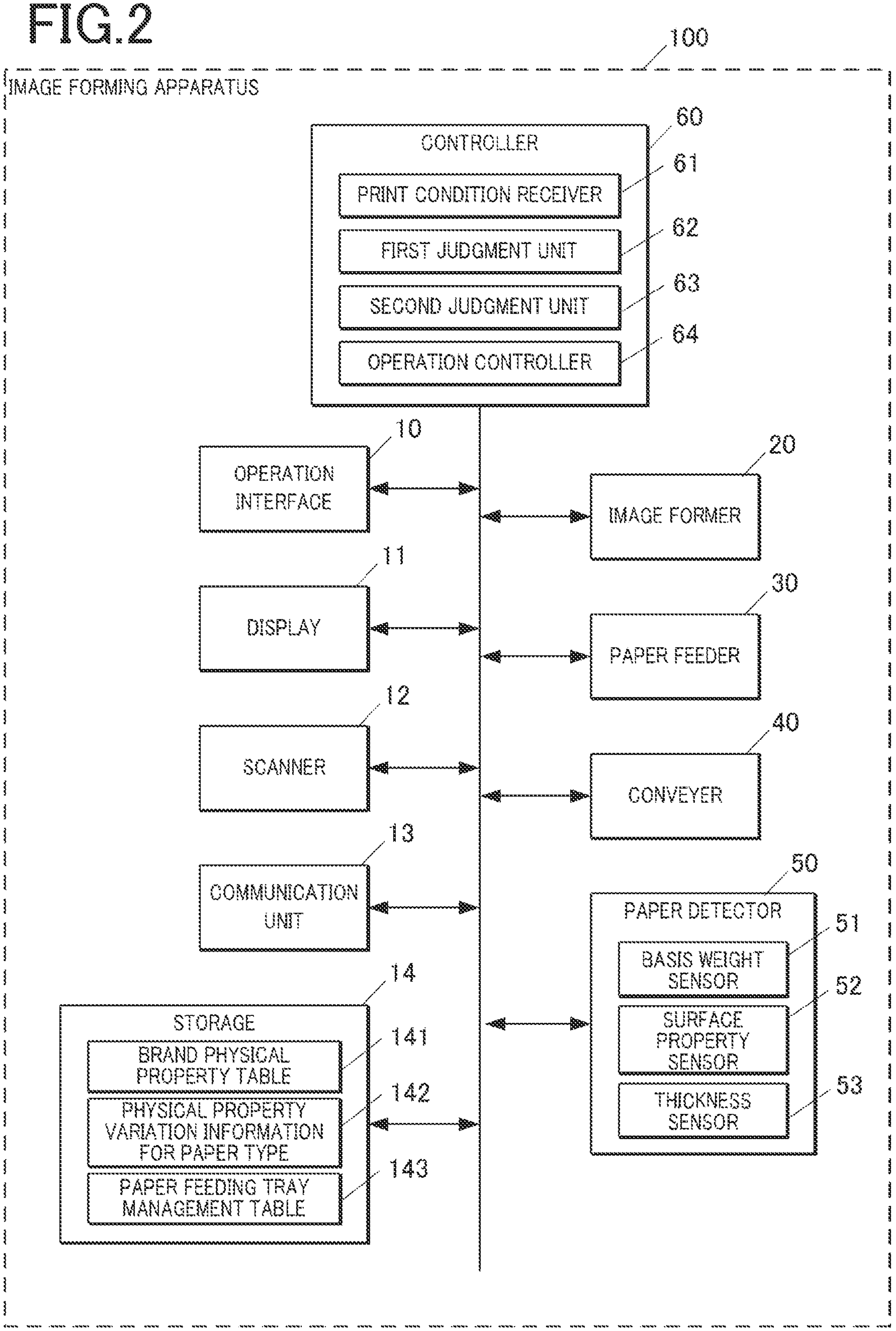
FIG. 2 is a block diagram showing a functional configuration of the image forming apparatus.

FIG. 2 is a block diagram showing a functional configuration of the image forming apparatus 100.

As shown in FIG. 2, the image forming apparatus 100 includes the operation interface 10, the display 11, the scanner 12, a communication interface 13, a storage 14, the image former 20, the paper feeder 30, the conveyer 40, the paper detector 50, the controller 60, and the like. Descriptions will be omitted for the functional units described above.

The communication interface 13 sends and receives data to and from external devices connected to a communication network such as a LAN (Local Area Network).

The storage 14 is configured with a non-volatile storage device such as a hard disk or flash memory, and stores various kinds of data. The storage 14 stores, for example, a brand-physical property table 141, paper type-physical property variation information 142, and a paper feeding tray management table 143.

The brand-physical property table 141 includes ranges of physical properties (basis weight, surface property, thickness, and the like) for each brand of paper. Each of the ranges of the physical properties includes, for example, an upper limit value and a lower limit value. The brand of paper may be "fine paper," "coated paper," "straw paper," or the like, or a product name.

The paper type-physical property variation information 142 is information for each paper type that associates the physical property values (basis weight, surface property, thickness, and the like) detected from a plurality of sheets of each paper type. The paper type is "fine paper," "coated paper," "straw paper," or the like.

The paper type-physical property variation information 142 includes combination of the physical property values obtained for each sheet.

In the paper feeding tray management table 143, the paper type, size, and the like of paper stored in each of the paper feeding trays are assigned to the corresponding paper feeding trays.

The paper detector 50 includes a basis weight sensor 51, a surface property sensor 52, and a thickness sensor 53.

The basis weight sensor 51 detects the basis weight of paper. For example, the basis weight of paper is measured based on some or all of the physical properties of paper, such as density, air permeability, stiffness, and electrical resistance. The basis weight may be detected using a result of paper weight directly measured by a weight sensor.

The surface property sensor 52 detects the surface property (smoothness, degree of smoothness) of the paper. The surface property of a paper is measured based on an intensity ratio, for example, using a reflection sensor that outputs intensity and/or intensity ratio of directly reflected light and scattered reflected light of illuminated light on the paper.

The thickness sensor 53 detects thickness of the paper. The thickness of the paper is measured, for example, by a displacement sensor that detects the distance between shafts of two rollers that can move in the thickness direction depending on the thickness of the paper.

The controller 60 is configured with a CPU (Central Processing Unit), ROM (Read Only Memory), RAM (Random Access Memory), and the like. The CPU reads various processing programs stored in the ROM, loads them on the RAM, and centrally controls the operation of each part of the image forming apparatus 100 according to the loaded program.

The controller 60 has functions as a print condition receiver 61, a first judgment unit 62, a second judgment unit 63, an operation controller 64, and the like. These functions are realized by the cooperation of the CPU and the programs stored in the ROM of the controller 60.

The print condition receiver 61 receives a print condition(s) designated by the user. The print condition includes paper identification information in order to identify the paper. In other words, the print condition receiver 61 functions as a receiver that receives the paper identification information in order to identify the paper designated by the user. The paper identification information is information that indicates the paper type or brand of the paper.

The first judgment unit 62 judges whether or not there is a correspondence between the paper identification information received by the print condition receiver 61 and the detection result by the paper detector 50. Here, if the physical property of the paper specified by the paper identification information is the same as the detection result by the paper detector 50 (physical property of the paper), it is judged that "there is a correspondence between the paper identification information and the detection result by the paper detector 50."

Specifically, the first judgment unit 62 judges whether or not there is a correspondence between the information indicating the paper type or brand of a paper received by the print condition receiver 61 and the detection result by the paper detector 50.

For example, the first judgment unit 62 obtains ranges of physical property values (basis weight, surface property, thickness, and the like) corresponding to a brand designated by the user from the brand-physical property table 141 in the storage 14, and judges whether or not each of the physical property values obtained by the paper detector 50 is in the range of the physical property values corresponding to this brand.

The first judgment unit 62 performs the judgement when the image former 20 starts an image formation job.

The second judgment unit 63 judges whether or not there is a correspondence between the detection result by the paper detector 50 of the first sheet of paper to be conveyed and the detection result by the paper detector 50 of the second sheet of paper to be conveyed. Here, if the detection result (physical property of the paper) for the first sheet is the same as the detection result (physical property of the paper) for the second sheet, it is judged that "there is a correspondence between the detection result by the paper detector 50 of the first sheet to be conveyed and the detection result by the paper detector 50 of the second sheet to be conveyed."

For example, the second judgment unit 63 compares the statistically processed value of the detection result of the first sheet with the statistically processed value of the detection result of the second sheet. The statistically processed value is a value (information) obtained by statistical processing.

The second judgment unit 63 calculates, based on the paper type-physical property variation information 142 in the storage 14, average values of physical property values (basis weight, surface property, thickness, and the like) for each paper type. The second determination unit 63 calculates, for each paper type, a square root of a sum of squares of differences between the physical property values (basis weight, surface property, thickness, and the like) of the first sheet of paper detected by the paper detector 50 and the corresponding average physical property value, and determines the paper type for which the value of this square root is the smallest to be the paper type of the first paper. Similarly, the second judgment unit 63 determines the paper type of the second sheet of paper. Then, the second judgment unit 63 compares the paper type of the first sheet of paper with the paper type of the second sheet of paper, and determines whether or not the two are the same as each other. Here, the paper type of the first sheet of paper corresponds to the "statistical processing value in the detection result of the first sheet of paper," and the paper type of the second sheet of paper corresponds to the "statistical processing value in the detection result of the second sheet of paper."

Figure 3:
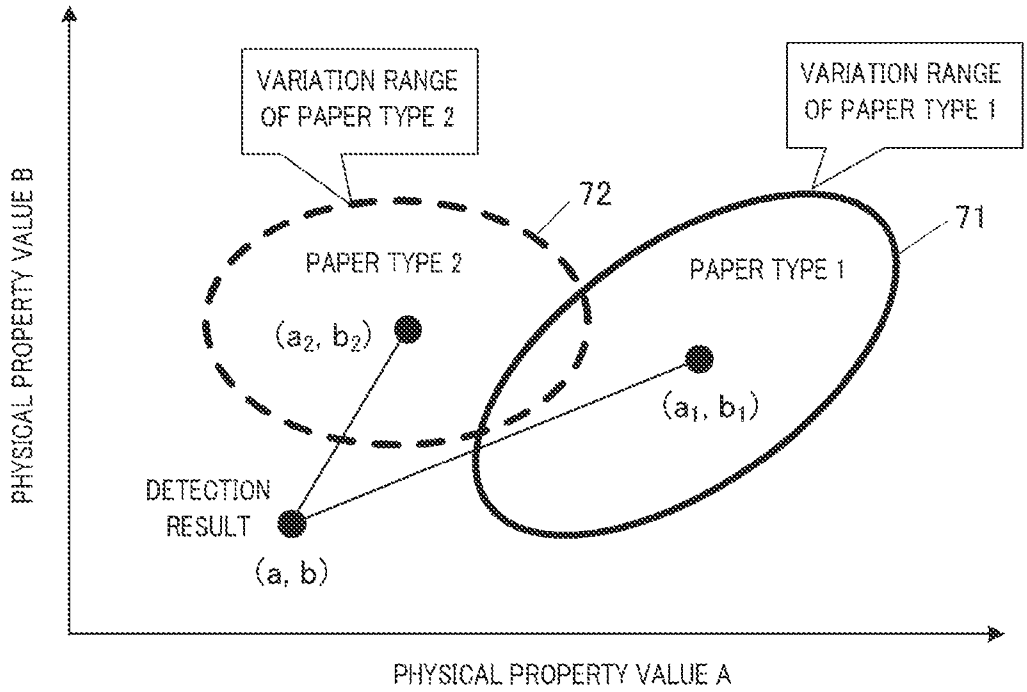
FIG. 3 is a diagram to explain a method of determining a paper type using two physical property values.

With reference to FIG. 3, the method of determining the paper type using two physical property values, A and B, will be described. In In FIG. 3, the horizontal axis represents the physical property value A (for example, basis weight) and the vertical axis represents the physical property value B (for example, thickness). The physical property values A and B of sheets of paper that is a paper type 1 are included in the paper type-physical property variation information 142 and are distributed in a scattered manner within an ellipse 71. The average of the physical properties A of the paper type 1 is at, and the average of the physical properties B of the paper type 1 is $b_1$. The physical property values A and B of sheets of paper that is a paper type 2 are included in the paper type-physical property variation information 142 and are distributed in a scattered manner within an ellipse 72. The average of the physical properties A of the paper type 2 is $a_2$, and the average of the physical properties B of the paper type 2 is $b_2$. Although not shown in the drawing, the average value of physical property value A of paper type i is $a_1$, and the average value of physical property value B of paper type i is $b_i$. When the detection results of the physical properties A and B of a newly fed sheet of paper by the paper detector 50 are represented by (a, b), the paper type i (in the case of FIG. 3, the paper type 2) for which the square root of $\{(a_i-a)^2+(b_1-b)^2\}$ is the minimum is determined to be the paper type of the newly fed sheet.

In the second judgment unit 63, it is assumed that the first sheet of paper and the second sheet of paper are sheets of paper that are conveyed in a continual manner.

The judgment criterion in the first judgment unit 62 is different from the judgment criterion in the second judgment unit 63. Specifically, while the first judgment unit 62 makes a judgment by comparing the paper identification information designated by the user and the detection result by the paper detector 50, the second judgment unit 63 makes a judgment by comparing the detection results of different sheets of paper by the paper detector 50.

The operation controller 64 controls the operation of the image former 20 based on the judgment result (first judgement result) by the first judgment unit 62 and the judgment result (first judgement result) by the second judgment unit 63.

For example, when it is judged in the first judgment unit 62 that there is no correspondence between the paper identification information designated by the user and the detection result by the paper detector 50, or when it is judged in the second judgment unit 63 that there is no correspondence between the detection result by the paper detector 50 of the first sheet of paper and the detection result by the paper detector 50 of the second sheet of paper, the operation controller 64 stops image formation by the image former 20.

When the first judgment unit 62 judges that there is no correspondence between the paper identification information designated by the user and the detection result by the paper detector 50, or when the second judgment section 63 judges that there is no correspondence between the detection result of the first sheet of paper by the paper detector 50 and the detection result of the second sheet of paper by the paper detector 50, the operation controller 64 causes the display 11 to display information about the judgment result by the first judgment unit 62 or the second judgment unit 63, and the detection result by the paper detector 50, and the like.

Next, the operation in the first embodiment will be described.

Figure 4:
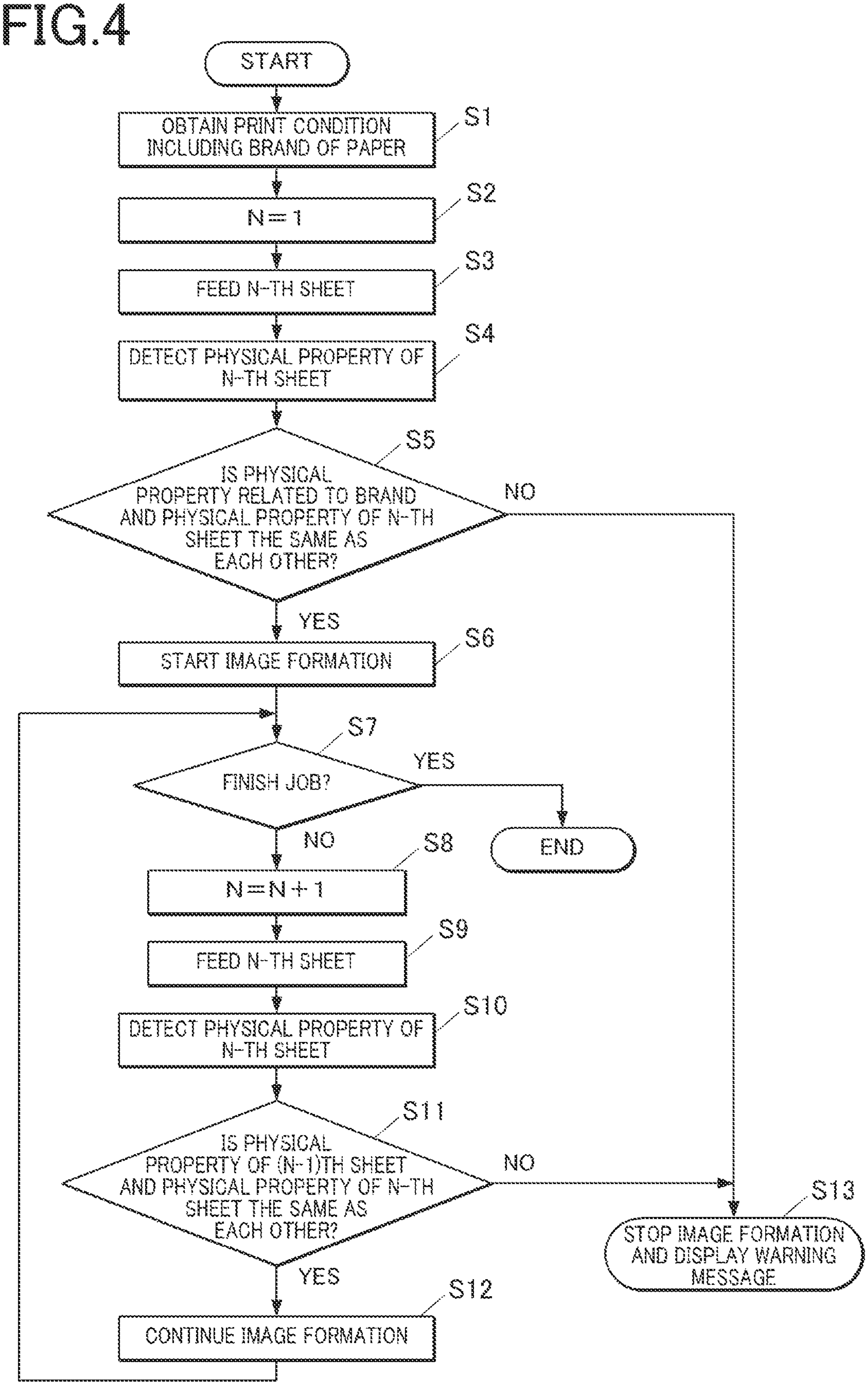
FIG. 4 is a flowchart showing a first paper inspection process executed by the image forming apparatus according to a first embodiment.

FIG. 4 is a flowchart showing a first paper inspection process executed by the image forming apparatus 100.

First, the print condition receiver 61 obtains print conditions, including a brand name of paper, regarding the image formation job to be executed (Step S1). Specifically, the print condition receiver 61 obtains the print conditions regarding the job that are received from an external device such as a PC (Personal Computer) via the communication interface 13. The print conditions include paper conditions such as the brand of paper, the number of sheets to be printed, post-processing (finishing conditions), and so on. The print conditions are designated by the user at the time of instructions to execute the job on the external device. Alternatively, the print condition receiver 61 may obtain the designated print conditions (including the brand of paper) from the operation interface 10. The print condition receiver 61 causes the storage 14 to store the the print conditions including the brand name of the paper.

Here, the operation controller 64 sets N to be 1 (step S2) and controls the paper feeder 30 to feed the N-th sheet of paper in the job (step S3).

The paper detector 50 detects the physical properties (basis weight, surface property, thickness, and the like) of the N-th sheet of paper conveyed by the conveyor 40 (Step S4), and the operation controller 64 obtains the detection results from the paper detector 50. The operation controller 64 causes the storage 14 to store the detection result of the physical properties of the N-th sheet of paper in correspondence with the value of N.

Next, the first judgment unit 62 judges whether or not the physical properties related to the brand are the same as the physical properties of the N-th sheet of paper detected in step S4 (step S5). Specifically, the first judgment unit 62 refers to the brand-physical property table 141 in the storage 14, obtains ranges of physical property values (basis weight, surface property, thickness, and the like) corresponding to the brand designated by the user, and judges whether or not the physical property values of the N-th sheet of paper are in these obtained ranges. In the judgment using a plurality of physical property values, when all the physical property values of the N-th sheet of paper are respectively in the range of physical property values corresponding to the brand, the first judgment unit 62 judges that the physical properties related to the brand correspond to the physical properties of the N-th sheet of paper.

If the first judgment unit 62 judges that the physical properties of the brand name correspond to the physical properties of the N-th sheet of paper (step S5; YES), the operation controller 64 causes the image former 20 to start image formation (step S6).

Next, the operation controller 64 determines whether or not the job has been finished (step S7). Specifically, the operation controller 64 determines whether or not image formation of the number of sheets designated in the job has been finished.

If the job has not been finished (step S7; NO), the operation controller 64 adds one to N (step S8) and controls the paper feeder 30 to feed the N-th sheet of paper in the job (step S9).

The paper detector 50 detects the physical properties (basis weight, surface property, thickness, and the like) of the N-th sheet of paper conveyed by the conveyor 40 (step S10), and the operation controller 64 obtains the detection results from the paper detector 50. The operation controller 64 stores the detection results of the physical properties of the N-th sheet of paper in the storage 14 in correspondence with the value of N.

Next, the second judgment unit 63 reads the detection results of the physical properties of the (N−1)th sheet of paper and the detection results of the physical properties of the N-th sheet of paper detected in step S10 from the storage 14, and judges whether or not the physical properties of the (N−1)th sheet of paper are the same as the physical properties of the N-th sheet of paper (step S11). Specifically, the second judgment unit 63 calculates, for each paper type, a square root of a sum of squares of differences between the physical property values of the (N−1)th sheet of paper and the corresponding average physical property value obtained from the paper type-physical property variation information 142 of the storage, and determines the paper type for which the value of this square root is the smallest to be the paper type of the (N−1)th sheet (see FIG. 3). Similarly, the second judgment unit 63 determines the paper type of the N-th sheet of paper. Then, the second judgment unit 63 judges whether or not the paper type of the (N−1)th sheet of paper is the same as the paper type of the N-th sheet of paper.

If the paper type of the N-th sheet of paper is stored in the storage 14 here, it is possible to omit determination of the paper type of the (N−1)th sheet of paper in the next step S11.

The second judgment unit 63 may judge that the physical properties of the (N−1)th sheet of paper correspond to the physical properties of the N-th sheet of paper simply when the difference between the physical properties detected from the (N−1)th sheet of paper and the N-th sheet of paper is less than a predetermined value, without comparing the paper types of the (N−1)th sheet of paper and the N-th sheet of paper. In the judgment using a plurality of physical property values, if difference between the physical property values detected from the (N−1)th sheet and the N-th sheet is less than or equal to the predetermined value (the values are different for each physical property value) for all the physical property values, the second judgment unit 63 judges that the physical properties of the (N−1)th sheet of paper correspond to the physical properties of the N-th sheet of paper.

If the second judgment unit 63 judges that the physical properties of the (N−1)th sheet of paper correspond to the physical properties of the N-th sheet of paper (step S11; YES), the operation controller 64 causes the image former 20 to continue image formation (step S12). Then, the process is repeated by returning to step S7.

If, in step S5, the first judgment unit 62 judges that the physical properties of the brand name are not the same as the physical properties of the N-th sheet of paper (step S5; NO), or if, in step S11, the second judgment unit 63 judges that the physical properties of the (N−1)th sheet of paper are not the same as the physical properties of the N-th sheet of paper (step S11; NO), the operation controller 64 causes the image former 20 to stop image formation and the display 11 to display a warning message (step S13). The warning message includes information on the judgment result that they are not the same as each other by the first judgment unit 62 or the second judgment unit 63, the detection result by the paper detector 50, and the like. For example, the display 11 may display a warning message such as "the paper in use is not of the designated brand," "the paper type is wrong," or the like.

If the job has been finished in step S7 (step S7; YES), the first paper inspection process ends.

As described above, according to the first embodiment, the first judgment unit 62 judges whether or not there is a correspondence between the paper identification information designated by the user and the detection result by the paper detector 50, and the second judgment unit 63 in turn judges whether or not there is a correspondence between the detection result of the first sheet of paper by the paper detector 50 and the detection result of the second sheet of paper by the paper detector 50. Then, the operation of the image former 20 can be controlled based on the judgment result by the first judgment unit 62 and the judgment result by the second judgment unit 63, thereby reducing waste of output materials due to mistakes in paper types.

In this way, accuracy of paper inspection is improved by checking the paper using two different judgment criteria. Specifically, the first judgment unit 62 can judge whether or not the paper to be used is of a paper type intended by the user. On the other hand, the second judgment unit 63 can determine whether or not the physical properties of two sheets of paper fed at different times are the same as each other.

The first judgment unit 62 can also judge whether or not there is a correspondence between the information indicating the paper type or brand of paper designated by the user and the detection result by the paper detector 50.

Since the first judgment unit 62 makes a judgment when the image former 20 starts an image formation job, it is possible to minimize the waste of output materials due to mistakes in paper type.

Also, the second judgment unit 63 can judge, using statistical processing values, whether or not there is a correspondence between the detection result of the first sheet of paper and the detection result of the second sheet of paper.

Also, the image former 20 stops image formation when the first judgment unit 62 or the second judgment unit 63 judges that there is no correspondence (or they are not the same as each other), so that the waste of output materials can be reduced.

Also, when the first judgment unit 62 or the second judgment unit 63 judges that there is no correspondence, it is possible to warn the user by the information on the judgment result and the detection result of the physical property displayed on the display 11.

Second Embodiment

Next, a second embodiment employing the present invention will be described.

The configuration of the image forming apparatus according to the second embodiment is the same as that of the image forming apparatus 100 shown for the first embodiment, so illustrations and descriptions are omitted, referring to FIG. 1 and FIG. 2. The configuration and processing unique to the second embodiment will be described below.

The second judgment unit 63 judges whether or not there is a correspondence between the detection result of the first sheet of paper to be conveyed by the paper detector 50 and the detection result of the second sheet of paper to be conveyed by the paper detector 50. The second judgment unit 63 makes the judgment before and after a sheet(s) of paper is supplied to the paper feeding trays 31, 32, 33 to be used for paper feeding in the paper feeder 30.

Each of the paper feeding trays 31, 32, 33 is provided with an open/close detector (not shown). Each open/close detector detects whether the paper feeding tray with the open/close detector is open (in an open state) or closed (in a closed state). The operation controller 64 determines that, if the open/close detector once detects the open state of the paper feeding tray and then detects the closed state, sheets of paper have been supplied to the paper feeding tray.

The above example does not limit how to detect that sheets of paper have been supplied to the paper feeding tray.

Next, the operations in the second embodiment will be described.

Figure 5:
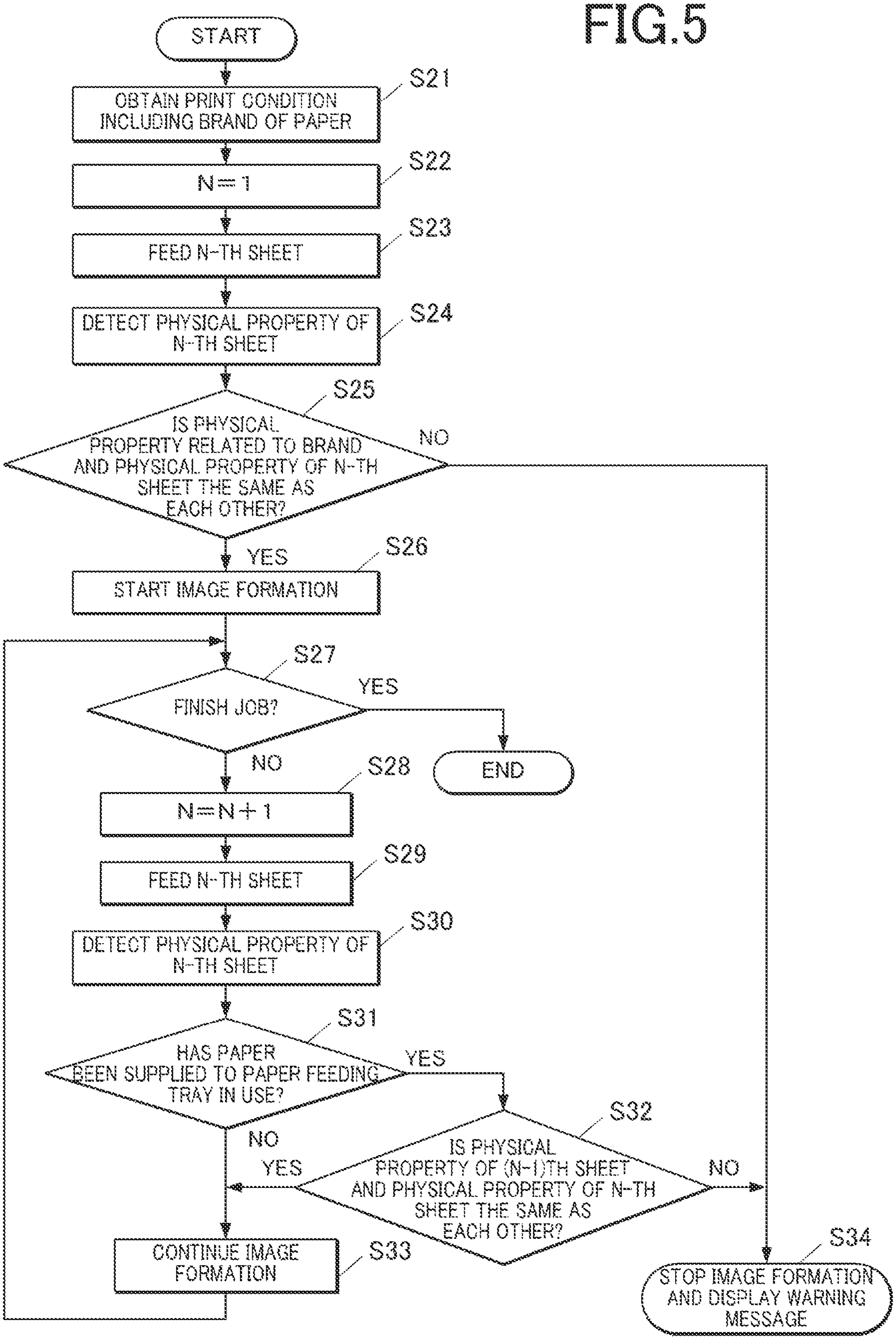
FIG. 5 is a flowchart showing a second paper inspection process executed by the image forming apparatus according to a second embodiment.

FIG. 5 is a flowchart showing a second paper inspection process executed by the image forming apparatus of the second embodiment.

The processes of step S21 to step S30 are the same as the processes of step S1 to step S10 of the first paper inspection process (see FIG. 4), and thus the description is omitted.

After step S30, the operation controller 64 determines whether or not a sheet(s) of paper has been supplied to the paper feeding tray in use (step S31). Specifically, the operation controller 64 determines whether or not the N-th sheet of paper is the first sheet of paper that is fed after supplying sheets of paper to the paper feeding tray in use. In more detail, after the (N−1)th sheet of paper has been fed and before the N-th sheet of paper has been fed, the operation controller 64 determines whether the closing state of the paper feeding tray has been detected after the open state by the open/close detector of the paper feeding tray in which the (N−1)th sheet of paper and the N-th sheet of paper have been stored.

If a sheet of paper has been supplied to the paper feeding tray in use (step S31; YES), that is, if the N-th sheet of paper is the first sheet of paper fed after the sheet of paper has been supplied to the paper feeding tray in use, the second judgment unit 63 reads the detection result of the physical properties of the (N−1)th sheet of paper and the detection result of the physical properties of the N-th sheet of paper detected in step S30 from the storage 14, and determines whether or not the physical properties of the (N−1)th sheet of paper are the same as the physical properties of the N-th sheet of paper (step S32).

If no sheet of paper has been supplied to the paper feeding tray in use immediately before feeding the N-th sheet of paper in step S31 (step S31; NO), or if the second judgment unit 63 judges in step S32 that the physical properties of the (N−1)th sheet of paper correspond to the physical properties of the N-th sheet of paper (step S32; YES), the operation controller 64 causes the image former 20 to continue image formation (step S33). Then, the process is repeated by returning to step S27.

If, in step S25, the first judgment unit 62 judges that the physical properties of the brand name are not the same as the physical properties of the N-th sheet of paper (step S25; NO), or if, in step S32, the second judgment unit 63 judges that the physical properties of the (N−1)th sheet of paper are not the same as the physical properties of the N-th sheet of paper (step S32; NO), the operation controller 64 causes the image former 20 to stop image formation and the display 11 to display a warning message (step S34).

In step S27, if the job is finished (step S27; YES), the second paper inspection process ends.

As described above, according to the second embodiment, the operation of the image former 20 can be controlled based on the judgement result by the first judgment unit 62 and the judgement result by the second judgement unit 63, thereby reducing waste of output materials due to mistakes in paper types.

In addition, since the second judgment unit 63 makes judgments before and after a sheet of paper is supplied to the paper feeding tray in use, it is possible to check the sheet of paper aiming at the timing when paper type errors are likely to occur, and to detect operational errors when the user supplies the sheet of paper at an early stage.

Third Embodiment

Next, a third embodiment employing the present invention will be described.

The configuration of the image forming apparatus according to the third embodiment is the same as that of the image forming apparatus 100 shown for the first embodiment, so illustrations and descriptions are omitted, referring to FIG. 1 and FIG. 2. The configuration and processing unique to the third embodiment will be described below.

The second judgment unit 63 judges whether or not there is a correspondence between the detection result of the first sheet of paper to be conveyed by the paper detector 50 and the detection result of the second sheet of paper to be conveyed by the paper detector 50. The second judgment unit 63 makes the judgment before and after the paper feeding tray used for paper feeding is switched from one of the paper feeding trays 31, 32, 33 to another thereof.

Each of the paper feeding trays 31, 32, 33 is provided with a paper run-out detector (not shown). Each paper run-out detector detects whether or not there still remains a sheet of paper in the paper feeding tray that is provided with the paper run-out detector. If the paper run-out detector of the paper feeding tray in use has detected that there is no sheet of paper in the paper feeding tray, the operation controller 64 refers to the paper feeding tray management table 143 in the storage 14, identifies the paper feeding tray in which paper of the same type and size as the paper in the paper feeding tray in use is stored, and switches the paper feeding tray from which paper is fed to the identified paper feeding tray.

Next, the operations in the third embodiment will be described.

Figure 6:
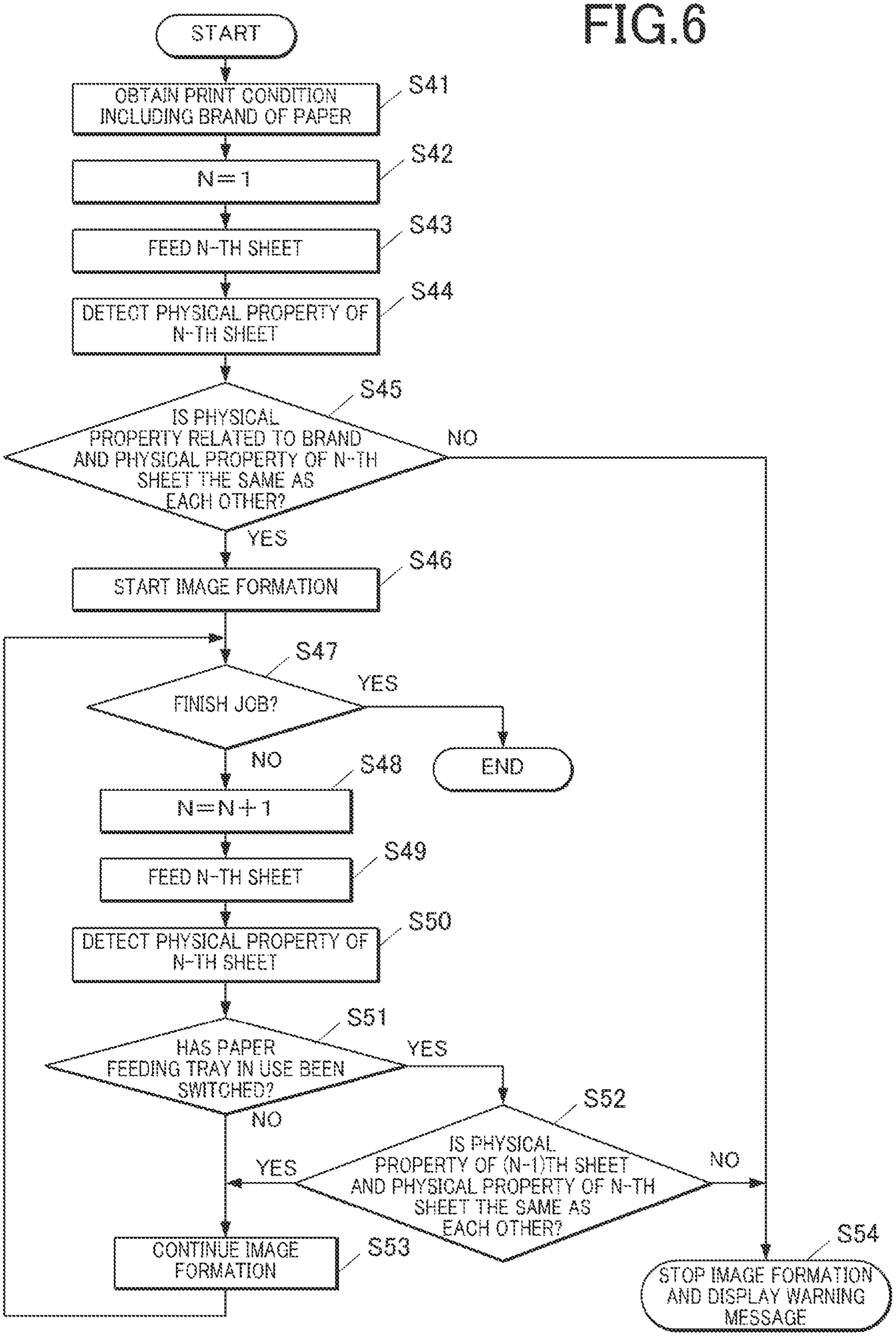
FIG. 6 is a flowchart showing a third paper inspection process executed by the image forming apparatus according to a third embodiment.

FIG. 6 is a flowchart showing a third paper inspection process executed by the image forming apparatus of the third embodiment.

The processes of step S41 to step S50 are the same as the processes of step S1 to step S10 of the first paper inspection process (see FIG. 4), and thus the description is omitted.

After step S50, the operation controller 64 determines whether or not the paper feeding tray in use has been switched (step S51). Specifically, the operation controller 64 determines whether or not the N-th sheet of paper is the first sheet of paper that is fed after switching of the paper feeding tray in use. In more detail, after the (N−1)th sheet of paper has been fed and before the N-th sheet of paper has been fed, the operation controller 64 determines whether or not the paper run-out detector has detected that there is no more paper in the paper feeding tray in which the (N−1)th sheet of paper has been stored and with which the paper run-out detector is provided.

If the paper feeding tray in use has been switched (step S51; YES), that is, if the N-th sheet of paper is the first sheet of paper fed after the switching of the paper feeding tray, the second judgment unit 63 determines whether or not the physical properties of the (N−1)th sheet of paper are the same as the physical properties of the N-th sheet of paper detected in step S50 (step S52).

If the paper feeding tray in use has not been switched immediately before feeding the N-th sheet of paper in step S51 (step S51; NO), or if the second judgment unit 63 judges in step S32 that the physical properties of the (N−1)th sheet of paper correspond to the physical properties of the N-th sheet of paper (step S52; YES), the operation controller 64 causes the image former 20 to continue image formation (step S53). Then, the process is repeated by returning to step S47.

If in step S45, the first judgment unit 62 judges that the physical properties of the brand name are not the same as the physical properties of the N-th sheet of paper (step S45; NO), or if, in step S52, the second judgment unit 63 judges that the physical properties of the (N−1)th sheet of paper are not the same as the physical properties of the N-th sheet of paper (step S52; NO), the operation controller 64 causes the image former 20 to stop image formation and the display 11 to display a warning message (step S54).

In step S47, if the job is finished (step S47; YES), the third paper inspection process ends.

As described above, according to the third embodiment, the operation of the image former 20 can be controlled based on the judgement result by the first judgment unit 62 and the judgement result by the second judgement unit 63, thereby reducing waste of output materials due to mistakes in paper types.

In addition, since the second judgment unit 63 makes judgments before and after switching of the paper feeding tray in use for paper feeding, it is possible to check the sheet of paper aiming at the timing when paper type errors are likely to occur, and to detect operational errors at an early stage when the sheet of paper is set in the paper feeding tray, errors in setting for the paper feeding tray management table 143.

The description in each of the above embodiments is an example of the image forming apparatus according to the present invention, and the present invention is not limited thereto. The present invention can be changed as necessary with respect to the detailed configuration and detailed operation of each part that constitutes the apparatus, as long as it does not deviate from the purpose of the invention.

For example, the characteristic configurations of the above embodiments may be combined.

In each of the above embodiments, the second judgment unit 63 judges whether or not there is a correspondence between the detection results by the paper detector 50 of respective two sheets of paper that are conveyed in a continual manner. However, the sheets of paper to be judged by the second judgment unit 63 do not have to be conveyed in a continual manner. For example, the second judgment unit 63 may judge whether or not there is a correspondence between the detection results by the paper detector 50 of the respective two sheets of paper when one or more sheets of paper are conveyed between the two sheets.

The second judgment unit 63 may compare an average physical property value of the plurality of sheets of first paper detected by the paper detector 50 and an average physical property value of the plurality of sheets of second paper detected by the paper detector 50.

The second judgment unit 63 may determine whether or not there is a correspondence between the detection result of the N-th sheet of paper by the paper detector 50 and the average value obtained by averaging the physical property values of all the sheets of paper up to the (N−1)th sheet of paper.

In the description of the above embodiments, the first judgment unit 62 judges whether or not there is a correspondence between the paper identification information received by the print condition receiver 61 and the detection result by the paper detector 50 of the first sheet of paper. However, the paper to be detected by the paper detector 50 does not have to be the first paper in the job. However, for early detection of paper errors, it is desirable to use the detection result of the sheet of paper fed shortly after the start of the job.

The first judgment unit 62 may make a judgment using the method based on the statistically processed values shown in FIG. 3. Specifically, for each brand, information including the physical properties (basis weight, surface property, thickness, and the like) detected from a plurality of sheets of a brand is prepared in advance. For the physical property values of the first sheet of paper detected by the paper detector 50, a square root of a sum of squares of differences from the average values for each brand is calculated, and then the first judgment unit 62 determines that the brand for which the value of this square root is the smallest is the brand of the first sheet of paper, and then judges whether or not the determined brand is the same as the brand designated by the user.

In each of the above embodiments, the paper detector 50 detects the physical properties of a sheet of paper such as basis weight, surface property, thickness, and the like, however, the paper detector 50 may detect one of the physical properties.

In each of the above embodiments, the physical properties of the paper are detected by the paper detector 50 provided on the paper conveyance path in the image forming apparatus 100, but some of the physical properties of the paper may be detected outside the image forming apparatus 100 (off-line).

In the above description, an example of using ROM as a computer-readable medium that stores the program for executing each process is described, but the medium is not limited to this. As the computer-readable medium, it is also possible to use non-volatile memory such as flash memory, a portable recording medium such as CD-ROM, and the like. Carrier waves may also be applied as a medium to provide the program data via communication lines.

What is claimed is:

1. An image forming apparatus comprising:

an image former that forms an image on a sheet of paper;

a detector that detects a physical property of a sheet of paper;

a receiver that receives paper identification information designated by a user, the paper identification information being used in identification of a sheet of paper; and a hardware processor that performs:

first judgement comprising judging whether there is a correspondence between the paper identification information received by the receiver and a detection result by the detector;

second judgement comprising judging whether there is a correspondence between a detection result by the detector with respect to a first sheet of paper conveyed and a detection result by the detector with respect to a second sheet of paper conveyed; and operation control of the image former based on a first judgement result of the first judgement and a second judgement result of the second judgement, wherein a judgment criterion in the first judgement is different from a judgment criterion in the second judgement.

2. The image forming apparatus according to claim 1, wherein the paper identification information indicates a paper type or a brand of paper, and wherein, in the first judgement, the hardware processor judges whether or not there is a correspondence between (i) information indicating a paper type or a brand of paper in the paper identification information received by the receiver and (ii) a detection result by the detector.

3. The image forming apparatus according to claim 1, wherein the detector detects a value regarding multiple physical properties of paper including a basis weight, a surface property, and a thickness, and wherein, in the second judgement, the hardware processor compares a statistically processed value obtained based on the detection result by the detector with respect to the first sheet of paper and a statistically processed value obtained based on the detection result by the detector with respect to the second sheet of paper.

4. The image forming apparatus according to claim 1, wherein, upon judging that there is no correspondence in one of the first judgement or the second judgement, the hardware processor causes the image former to stop forming of an image in the operation control.

5. The image forming apparatus according to claim 1, further comprising a display, wherein, upon judging that there is no correspondence in one of the first judgement or the second judgement, the hardware processor causes the display to display information on at least one of the first determination result, the second determination result, and a detection result by the detector in the operation control.

6. The image forming apparatus according to claim 1, wherein the hardware processor performs the first judgement at a time when the image former starts an image forming job.

7. The image forming apparatus according to claim 1, further comprising a paper feeding tray from which a sheet of paper is able to be fed, wherein the hardware processor performs the second judgement before and after a sheet of paper is supplied to the paper feeding tray.

8. The image forming apparatus according to claim 1, further comprising a plurality of paper feeding trays from each of which a sheet of paper is able to be fed, wherein the hardware processor performs the second judgement before and after a paper feeding tray from which a sheet of paper is fed is switched from one of the plurality of paper feeding trays to another of the plurality of paper feeding trays.

9. The image forming apparatus according to claim 1, wherein the first sheet of paper and the second sheet of paper are sheets of paper that are conveyed consecutively.

* * * * *